July 8, 1947. K. RATH 2,423,616
SELF BALANCING TRANSLATION SYSTEM
Filed Feb. 1, 1944 3 Sheets—Sheet 1
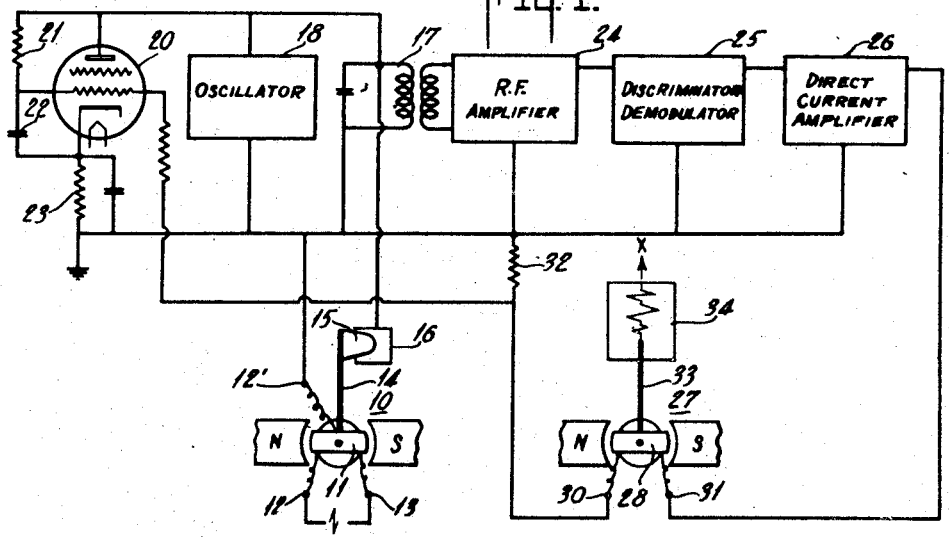
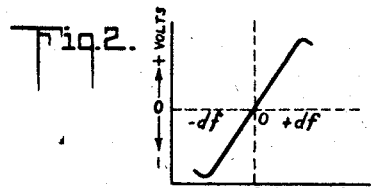
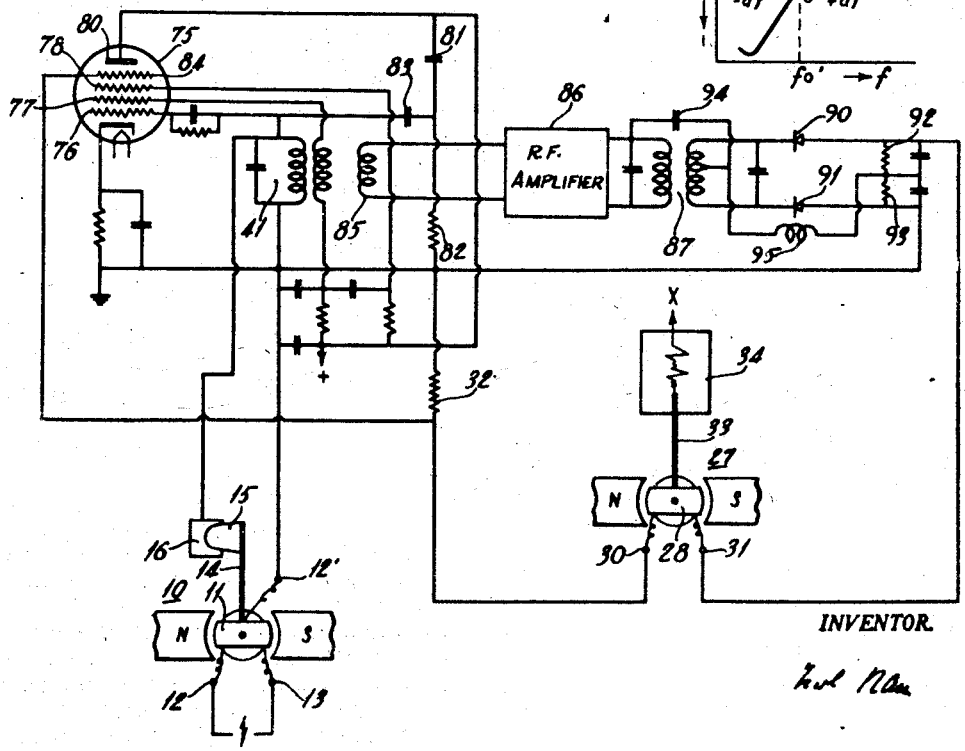
INVENTOR.

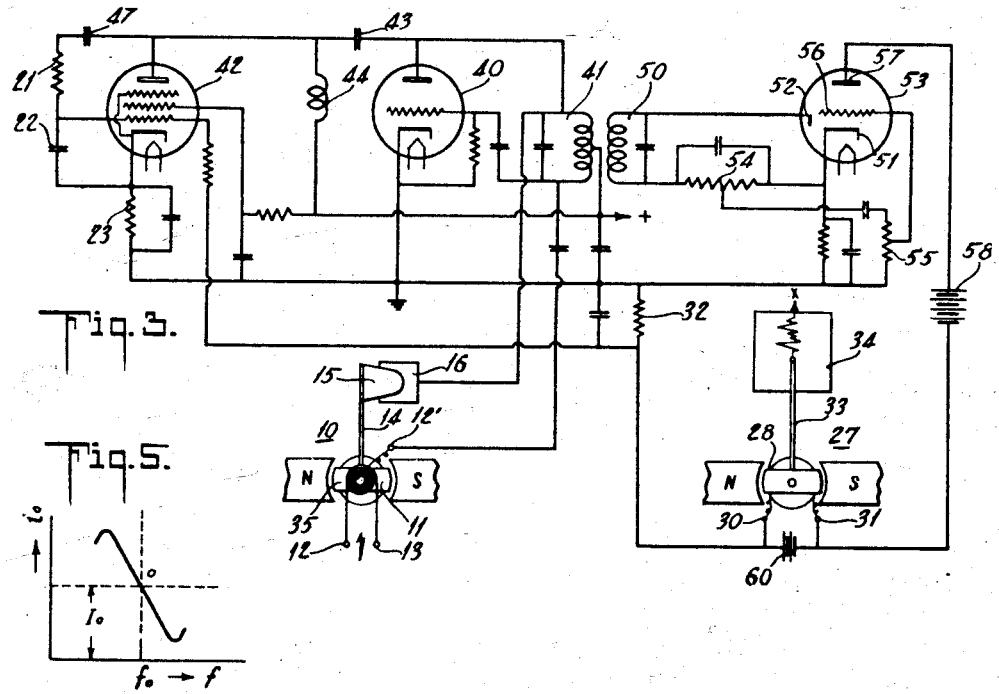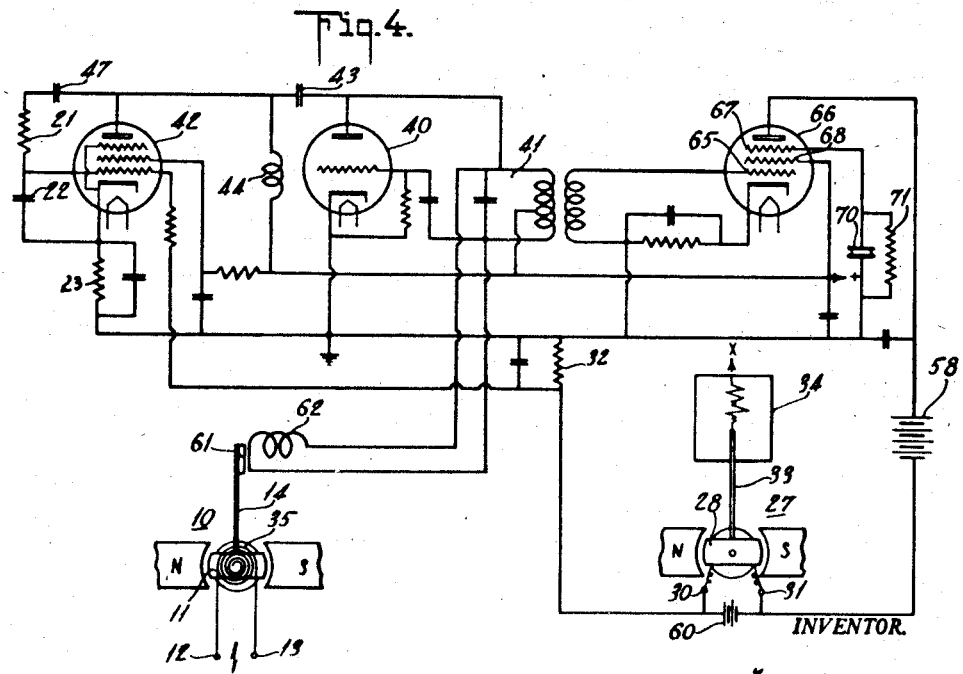

July 8, 1947.  K. RATH  2,423,616
SELF BALANCING TRANSLATION SYSTEM
Filed Feb. 1, 1944  3 Sheets-Sheet 3
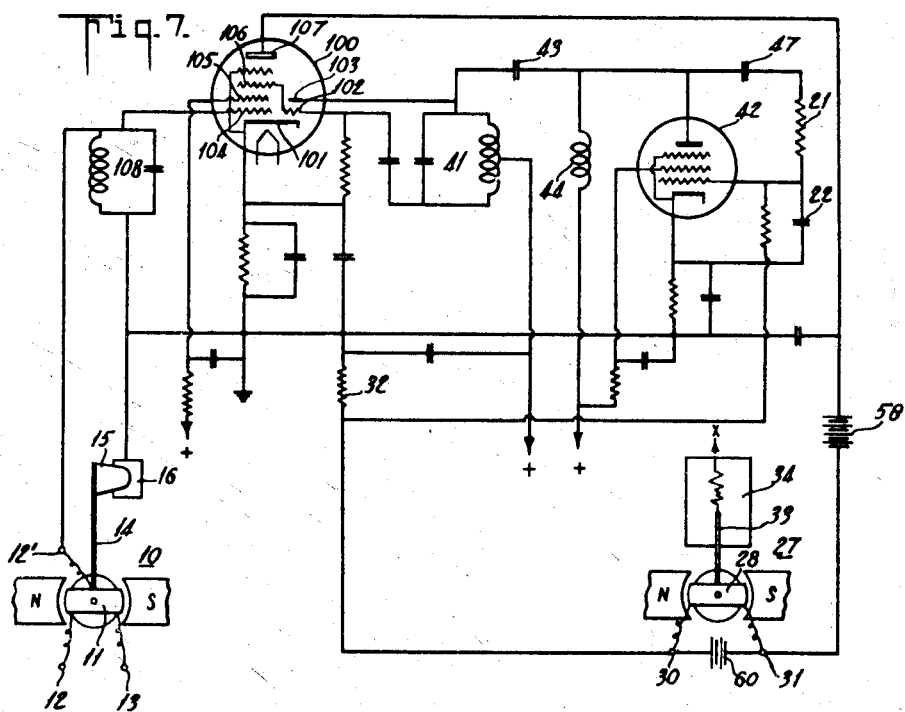
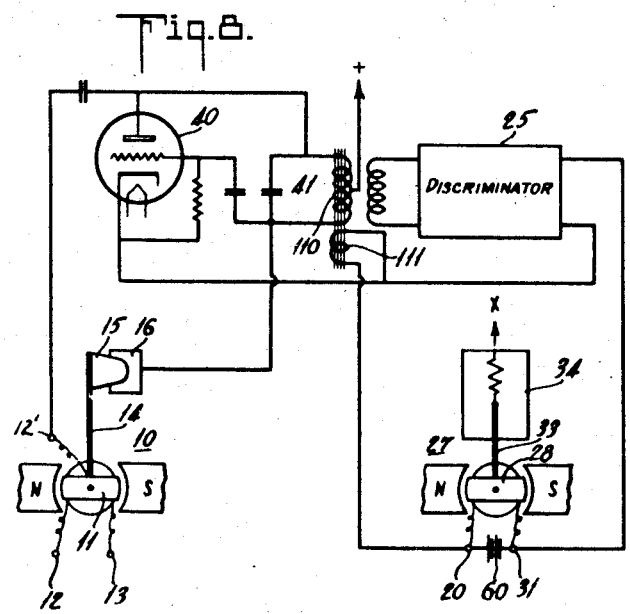
INVENTOR.

Patented July 8, 1947

2,423,616

UNITED STATES PATENT OFFICE 2,423,616

SELF-BALANCING TRANSLATION SYSTEM

Karl Rath, New York, N. Y., assignor to Radio Patents Corporation, New York, N. Y., a corporation of New York Application February 1, 1944, Serial No. 520,636

5 Claims. (Cl. 177—351)

1

The present invention relates to follow-up type potentiometric translating systems for translating or converting variations of an electric or other magnitude of a basic or input device into corresponding variations of a secondary or output device, such as an indicator, recorder, automatic control device or the like.

Arrangements of this type essentially comprise a basic element such as a sensitive galvanometer to produce a movement in proportion to variations of a weak electric current, a relatively heavy secondary or output element such as an electro-magnetic indicator or recorder to be operated in accordance with the input magnitude variations, a balanced electrical system adapted to be unbalanced by an initial response or deflection of the basic element to produce an off-balance output current suitable for energizing the secondary element, and an inverse feedback arrangement between the secondary and basic elements, whereby to restore and maintain the balance condition in such a manner as to result in a continuous follow-up relation between the basic and secondary elements.

In my co-pending application, Serial No. 504,107, filed November 28, 1943, entitled "Potentiometric amplifier," I have described a system of this type utilizing a frequency balance between a source of operating frequency and a resonant impedance means such as a tuned circuit, piezo-electric crystal and the like to maintain a continuous balance or follow-up relation between the response of the basic and secondary elements such as a sensitive galvanometer and electro-magnetic recorder, respectively.

Arrangements of this type are especially suited for indicating or recording extremely small amounts of electrical energy such as supplied by a thermo-electric couple, a photo-voltaic cell or any other source supplying minute amounts of electric input potential or current. In order to restore and maintain the balance, there is provided a small electrical resistance common to the input and output circuits and adapted to produce a compensating potential drop by the output current to buck or neutralize the initial input current variations and to maintain the electric balance of the system. In view of the substantial ratio between the input and output currents, the balancing or feedback resistance assumes extremely small values and difficulties may arise in the proper adjustment and maintenance of the balance condition due to slight variations in the circuit constants and other parameters of the system. Furthermore, arrangements of this type

2 are limited to the use of basic elements responsive to electric currents or potentials such as a galvanometer or other highly sensitive electrical instrument.

Accordingly, an object of my invention is to provide a system of the above character in which a substantially increased compensating or balancing potential derived from the output current is used, resulting in improved facilities in adjustment and maintenance of the accuracy of the balance and stability of the system.

Another object is to provide a system of this character which is not limited to an electrically controlled input or basic element and which can be used in connection with any type of sensitive indicator actuable in response to both electrical and other magnitudes or conditions such as heat, pressure and the like.

I have furthermore described in another co-pending application, Serial No. 519,003, filed January 20, 1944, entitled "Electrical apparatus" a system of this type utilizing an element of the frequency balancing system such as a variable condenser in mechanical coupling relation with the output element so as to follow the movements of the latter for restoring and maintaining the balance of the system. The present invention is a further development of this idea in substituting purely electrical means for the mechanical coupling for restoring and maintaining the frequency balance.

Accordingly, a further object of the invention is to obtain a balancing effect by purely electrical means whereby to avoid mechanical elements and couplings and to provide increased flexibility and adaptability of the system for special purposes and requirements.

With the above objects in view, the invention generally involves the provision of additional means in the form of a voltage or current controlled electrical reactance such as an electronic reactance tube for restoring and maintaining the frequency balance in response to an off-balance output current or potential, substantially independently of the character and operation of the basic or input element.

These and further objects and aspects of my invention will become more apparent from the following detailed description taken in reference to the accompanying drawings forming part of this specification and wherein:

Figure 1 is a schematic circuit diagram of an indicating or other translating system embodying the principles of the invention; Figure 2 is a graph explanatory of the function and operation of Figure 1; Figures 3 and 4 are circuit diagrams illustrating, by way of example, practical embodiments of the invention; Figure 5 is a graph explanatory of the function of the discriminator shown in Figure 4; and Figures 6 to 8 illustrate further modified circuit arrangements embodying the principle of the invention.

Like reference characters identify like parts throughout the different views of the drawings.

Referring to Figure 1, I have shown at 10 a basic element in the form of a sensitive galvanometer comprising a moving coil 11 mounted between magnet coils N and S and having terminals 12 and 13 connected thereto in any suitable manner through flexible conductors such as a pair of torque springs in accordance with the usual construction of devices of this type. Moving coil 11 carries a pointer 14 to the end of which is attached a metal vane or electrode 15 arranged to cooperate with a fixed electrode 16 to form a variable electrical condenser. This condenser is connected in shunt to the frequency determining element or tank circuit 17 of a high frequency oscillator to vary or control the oscillating frequency in accordance with the deflection of the moving coil 11 in response to a varying input current applied to terminals 12 and 13.

This input current may be supplied by a thermo-couple, photovoltaic cell or any other source of weak electric energy. In order to make connection to the movable electrode 15, the latter is connected to a stationary terminal 12' by way of the pointer 14 and a flexible conductor in a manner indicated and well understood. The tank circuit 17 may be associated with any suitable oscillation sustaining device 18 known in the art such as a "negative" resistance in the form of a regenerative vacuum tube circuit for generating sustained electrical oscillations having a frequency determined by the resonant frequency of the circuit 17.

In addition to the condenser 15—16 controlled by the deflection of the galvanometer, there is furthermore shunted across the tank circuit an electrically controlled reactance to additionally determine the oscillating frequency and, in the example shown, taking the form of an electronic reactance tube 20 having its input grid excited in a known manner by an oscillating potential derived from the tank circuit by way of a quadrature phase shift device comprising a resistance 21 in series with a condenser 22. A condenser shunted further resistance 23 in the common grid and anode circuit return to the cathode serves to provide a proper grid bias potential for the tube in accordance with standard practice.

The oscillations varying in frequency in accordance with the deflection of the moving coil 11, i. e. the instantaneous magnitude of the input current or potential, are applied if desirable by way of an R. F. amplifier 24, to a frequency discriminator or demodulator 25. The discriminator 25 is a device capable of producing a direct output current varying in sense and magnitude in accordance with the relative frequency departure of the input oscillations from a fixed frequency determined by the resonating frequency of a suitable resonant impedance means such as a tuned circuit, piezo-electric crystal or the like as shown in greater detail in the succeeding illustrations.

The general operating characteristic of the discriminator is shown in Figure 2 wherein output volts are plotted as a function of the input frequency $f$. For a predetermined frequency $f_0$ corresponding to the normal or unvaried frequency of the oscillator, the discriminator voltage is zero or may have a constant value and varies in a substantially linear fashion within a given operating range as the operating frequency departs in either sense from the frequency $f_0$ or vice versa as indicated by the frequency departures $+df$ and $-df$ in Figure 2.

The output of the discriminator which, if desirable may be further amplified by means of a direct current amplifier 26, serves to energize a secondary or output element 27 shown as an electro-magnetic recorder in the drawing, but which may be of any other character such as an indicator or the controlling element in an automatic control system. In the example shown, the recorder or indicator 27 comprises a moving coil 28 cooperating with a pair of magnet poles N and S and having terminals 30 and 31 connected thereto through flexible conductors in a manner indicated and well known. Moving coil 28 carries a pointer or recording pen 33 arranged to cooperate with a chart 34 moving at a constant speed in the direction of the arrow $x$ so as to result in a permanent record of the pointer deflection. The discriminator output current is furthermore passed through an inverse feedback or compensating resistance 32 to produce a voltage drop varying in accordance with the frequency departure or unbalance of the system and serving to control the reactance tube 20 or other electrically responsive reactance element arranged to restore and maintain the original frequency balance immediately upon an initial unbalance due to an input current variation or initial deflection of the galvanometer 10.

Reactance control tube 20, as pointed out, is excited in a known manner from the oscillator circuit by way of the quadrature phase shift circuit comprising in the resistance 21 in series with a condenser 22 and connected across the tank circuit 17. By proper design of resistance 21 so as to present a high impedance to the oscillations compared with the condenser 22, the current through the circuit 21, 22 will be in phase with the oscillating current. Accordingly, the potential drop through the condenser 22 applied to the input grid of the tube 20 will lead the current by 90°, resulting in a corresponding quadrature plate potential and injection of a virtual reactance into the tank circuit 17. The magnitude of this reactance depends on the mutual conductance of the tube and is controlled in accordance with the discriminator output voltage by connecting the input grid to the compensating resistance 32 in the manner shown. The connections and polarization of the various elements are such that an initial unbalance caused by the condenser 15—16 in one sense from the normal or balanced condition will result in a corresponding variation of the reactance of the tube 20 to counteract the unbalance and to restore the balance condition of the system.

Resistance 23 in the common grid and plate circuit of the tube 20 serves to provide a steady negative grid bias potential upon which is superimposed the varying positive potential supplied by the resistance 32. By the proper design of the resistances 23 and 32 a correct compensation and frequency balance may be insured. Since the voltage for controlling the grid of tube 20 is of the order of several volts, accurate balance and stability of the balancing operation can be obtained in an efficient and easy manner compared with systems of this type, wherein the balancing resistance is inserted in the input circuit of the galvanometer 10 and accordingly has to be of an extremely small size. Furthermore, it is understood that since the balance is effected in an electrical circuit other than the galvanometer circuit, any other basic element responsive to variations of an input magnitude or condition other than electrical, such as a barometer, thermometer, or in fact any device producing slight mechanical movement, can be employed in connection with the invention.

Referring to Figure 3, I have shown a complete circuit diagram illustrating a practical embodiment of the invention. In this modification, 40 is a triode oscillator of the well known Hartley type comprising a tank circuit 41 connected between the plate and grid and having a tap of its inductance connected to the cathode, whereby to generate sustained electric oscillations at a frequency determined by the resonating frequency of the circuit 41. Numeral 42 represents a pentode connected across the tank circuit 41 by way of coupling condenser 43 to act as an electronic reactance for controlling the oscillating frequency. The anode of the reactance tube is connected to a suitable source of plate current supply indicated by the plus symbol in the drawing through a choke coil 44 and to the phase shift circuit 21, 22 by way of a large coupling condenser 47.

Variable condenser 15—16 associated with the galvanometer 10 is shunted across the tank circuit 41, whereby to determine the oscillating frequency in a manner understood from the foregoing. The oscillations are applied from the tank circuit 41 to a frequency discriminator comprising a tuned circuit 50 adjusted to be off resonance with the normal or unmodulated frequency corresponding to the zero or normal position of the galvanometer. In other words, circuit 50 is detuned in such a manner as to operate along one branch of its resonance curve, whereby the oscillations of varying frequency will be converted into oscillations of varying amplitude which latter are rectified by connecting the circuit 50 to the diode section 51—52 of a diode-triode tube 53 through a condenser shunted load resistance 54 in the manner shown and well known. A suitable portion of the rectified voltage is applied to a further potential divider 55 serving to control the amplifier grid 56 and to produce an output current flowing to the plate 57 and varying in accordance with the oscillator frequency variations.

The plate current serves to energize the moving coil 28 of the recorder 27. For this purpose a plate battery or other source 58 is connected between the plate 57 and the terminal 31 of the recorder, the remaining terminal 30 being connected to cathode or ground through the feedback or compensating resistance 32. The latter serves to control the grid of the reactance tube 42 in substantially the same manner as described in connection with Figure 1. In order to buck out or balance the steady plate current corresponding to the normal position of the galvanometer, a compensating battery 60 is shown connected across the recorder 27 or other output device.

The operation of the system is substantially the same as described hereinabove in connection with Figure 1. In the normal position, the moving coils 11 and 28 of the galvanometer and recorder will be at rest such as shown in the drawing. If the galvanometer is deflected in one or the other direction, a corresponding variation of the capacity of condenser 15—16 will result in a change of the oscillating frequency. This in turn causes exciting current to flow through the moving coil 28 in a definite direction resulting in a deflection of pointer or pen 33 and a corresponding bias potential to be applied to the grid of the reactance tube 42 by the resistance 32. As a result, the virtual reactance impressed by tube 42 upon the tank circuit 41 will change in such a manner as to counteract the variation of the condenser 15—16 in a manner to restore the original balance condition.

If the galvanometer is deflected in the opposite direction, the discriminator output current flowing through the moving coil 28 will also be in the opposite sense and the grid potential of the reactance tube 42 will vary in a corresponding direction so as to again result in a compensation of the initial frequency deviation caused by the galvanometer. As a result of this continuous balancing action, the deflection of the pointer or pen 33 of the recorder 37 will follow the movement of the pointer 14 of the galvanometer 10 instantly and in direct proportion to the input potential or current energizing the galvanometer.

A system of this type has the advantage over normal amplifiers without feedback or follow-up operation that tube and circuit constants enter only as a secondary function of balancing, so that the system is inherently stable and the amplification substantially linear throughout the entire operating range.

Referring to Figure 4, I have shown a modification of the invention differing from Figure 3 in the employment of a special type of discriminator and in the control of the oscillating frequency by the basic element or galvanometer 10. For this purpose, the pointer 14 of the galvanometer has attached thereto a plate or screen 61 of highly conductive material moving adjacent to an inductance coil 62 shunted across the tank circuit 41 of the oscillator. In this manner the inductance of the coil 62 may be varied depending on the position of the pointer 14 and resulting in a corresponding variation of the oscillating frequency. If desired, the metal element 61 may be arranged to affect the inductance of the tank circuit 41 directly to dispense with the separate inductance coil 62.

The discriminator or off-balance detector shown in Figure 4 is of the known space charge type comprising a vacuum tube 66 having an inner control grid 65 near its cathode excited by the oscillating frequency and having an outer control grid 67 near its anode connected to ground or cathode through a discriminating resonant impedance such as a piezo-electric crystal 70 shunted by a high ohmic resistance 71 as shown in the drawing. Grids 65 and 67 are separated from each other by an accelerating or screen grid 68 to produce a concentrated space charge or virtual cathode adjacent to the grid 67 in a manner well understood by those skilled in the art. In place of the crystal 70, a parallel- or series-tuned resonant circuit may be provided in accordance with well known practice.

The function of a discriminator of this type is due to the inter-action of the control potentials established upon grids 65 and 67, the latter being excited by space charge coupling with the electron stream at a phase relative to the input phase on the grid 65 depending upon the relative frequency departure between the oscillations and the fixed resonating frequency of the crystal 70 or a discriminating resonant circuit. As a result of this inter-action, the steady plate current $i_0$ varies in a manner shown in Figure 5 as a function of the input frequency $f$. For the unmodulated frequency $f_0$ of the latter, corresponding to the resonating frequency of the crystal 70, the plate current has a normal value $I_0$ equal to the steady plate current present if one of the control grids were omitted and determined by the steady biasing and operating potentials of the tube. If the oscillating frequency deviates in either sense from the normal frequency $f_0$, the steady plate current will increase or decrease as shown in Figure 5 resulting in a corresponding excitation of the recorder or other output device 27 in substantially the same manner as described in connection with Figure 3. By bucking out or compensating the normal plate current $i_0$ by the compensating battery 60 a continuous follow-up relation between the galvanometer input potential and the recorder is obtained, provided that proper design and polarization of the various circuit elements and parameters have been made to cause the relative frequency departures effected by the galvanometer 10 and the reactance tube 42 in response to an initial deflection of the galvanometer to counteract each other in a manner to restore and maintain the balance condition.

Referring to Figure 6, I have shown a simplified circuit utilizing a combined oscillator and electronic reactance to dispense with a separate reactance control tube. There is shown for this purpose a vacuum tube 75 having an inner control grid 76 followed by a first screen grid 77, a further screen grid 78 and a plate 80. The grids 76 and 77 are part of a standard regenerative feedback oscillator comprising a tank circuit 41 and inductive feedback coil connected to the screen grid 77 serving as the oscillator output electrode. In addition to the regular or in-phase feedback for maintaining the oscillations, additional feedback energy supplied by the plate 80 is impressed upon the tank circuit through a suitable phase shift circuit to inject a virtual reactance into the tank circuit for controlling the oscillating frequency. For this purpose, plate 80 is connected to the cathode through a condenser 81 in series with a high ohmic resistance 82 and the junction between the latter is coupled to the high potential side of the tank circuit through a coupling condenser 83. The amount of reactive feedback supplied by the plate 80 is controlled by an additional control grid 84 located near the plate and biased by the compensating or feedback potential supplied by the resistance 32 in series with the discriminator and moving coil of the recorder 27.

The frequency of the oscillator tank circuit is furthermore controlled in accordance with the capacity changes of the condenser 15—16 associated with the galvanometer 10 in substantially the same manner as described in the preceding illustrations. The oscillations are applied from the tank circuit 41 by way of coupling coil 85 to a stabilized R. F. amplifier 86 the output of which energizes a phase shift type discriminator well known in the art. The latter comprises a resonant transformer 87 having its secondary terminals connected to a pair of serially arranged condenser-shunted load resistors 92 and 93 by way of linear rectifiers such as a pair of diodes 90 and 91. The center tap of the secondary transformer winding is coupled to the high potential side of the input winding through coupling condenser 94 and is furthermore connected to the junction of the resistors 92 and 93 by way of a choke coil 95. The function of this discriminator is based in a known manner upon the varying relative phase shift between the primary and secondary voltages of the transformer 87 as a function of the input frequency, resulting in an output voltage across the free ends of resistances 92 and 93 varying in substantially the same manner as shown in Figure 2. This output voltage is utilized to energize the recorder 27 and to provide the control potential for the reactance control grid 84 of tube 75 by the voltage drop through feedback resistance 32 in a manner substantially similar to and understood from the above.

According to a modification of the invention the reactance variations produced by the basic device or galvanometer may be utilized to control the discriminator circuit and the reactance variations produced by the output device or recorder may serve to control the frequency of the oscillator. In this embodiment, again the design and polarization of the various elements is such that a continuous frequency balance between the oscillating frequency and the resonating frequency of the discriminator is instantly restored and maintained to result in a continuous follow-up relation between the input and output elements.

An arrangement of this latter type is shown in Figure 7 comprising a composite triode-pentode oscillator and discriminator tube 100 including a common cathode 101, triode grid 102, triode plate 103, inner pentode control grid 104, pentode screen grid 105, outer control grid 106 and pentode plate 107. A conventional oscillator circuit comprising the tank circuit 41 is operatively connected with the triode section of the tube and the pentode section is arranged to act as a space type charge discriminator by a direct internal connection between the oscillator grid 102 and the outer pentode control grid 106 and the provision of a resonant circuit 108 connected between the inner control grid 104 and ground or cathode. This discriminator is substantially similar to the discriminator 66 in Figure 4, with the exception that the crystal 70 is replaced by the resonant circuit 108 as a discriminating or resonant impedance means.

There is furthermore associated with the tank circuit 41 an electronic reactance tube 42 arranged and connected in substantially the same manner as described hereinbefore. The variations of the condenser 15—16 associated with the basic device or galvanometer 10 control the resonant frequency of the discriminating circuit 108 and the feedback or output potential developed by the resistance 32 is arranged to control the reactance tube 42. By the proper design of the circuit constants and parameters, an initial detuning of the discriminator circuit 108 in response to a deflection of the galvanometer 10 will be balanced by a corresponding change of the operating frequency by the reactance tube 42 in a manner to restore and continually maintain the frequency balance between the oscillating frequency and the resonating frequency of the discriminator, whereby again to cause the recorder or indicator to follow exactly the input current variation applied to the galvanometer.

As is understood, other electrically controlled reactance devices such as an inductance premagnetized by a direct current and other devices known in the art may be employed for restoring the frequency balance by the discriminator output current within the scope of this invention. An arrangement of this type utilizing a tank circuit inductance and pre-magnetization control is shown in Figure 8. In the latter, the tank circuit 41 of a standard regenerative or equivalent oscillator includes an iron core inductance 110 provided with an auxiliary magnetization winding 111 to produce a definite inductive reactance of the tank circuit 41. An initial deflection of the galvanometer pointer 14 and corresponding variation of the oscillating frequency by a corresponding variation of the capacity of condenser 15—16 results in a corresponding increase or decrease, respectively, of the magnetization current through the winding 111, in such a manner as to readjust the frequency and to restore and maintain a continuous frequency balance in a manner similar to and understood from the foregoing.

It will be evident from the foregoing that the invention is not limited to the specific circuits and arrangements of parts and details described herein for illustration, but that underlying novel principle and thought are susceptible of numerous variations and modifications coming within the broader scope and spirit of the invention as defined in the appended claims. The specification and drawings are accordingly to be regarded in an illustrative rather than in a limiting sense.

I claim:

1. An electrical system comprising a primary element having a movable member, a secondary element having a movable member responsive to and adjustable by and in proportion to an electric control current, an oscillation generator including a first resonant impedance means having a resonating frequency determinative of the oscillation frequency, a frequency discriminator connected to said oscillator, said frequency discriminator including a resonant impedance means and being adapted to produce a control current varying in sense and magnitude in proportion to the relative frequency departure between the resonating frequencies of said first and second resonant impedance means, means for controlling said secondary element in accordance with said control current, further means associated with said primary element to vary the resonating frequency of one of said impedance means in response to a movement of said first movable member, an electronic reactance tube operatively connected to said oscillation generator, and means to control said reactance tube in accordance with said control current to counteract an initial frequency departure between said first and second resonant impedance means, to thereby restore and maintain a frequency balance between said first and second impedance means and to maintain said secondary element in a substantially instantaneously and continuously balanced follow-up relation with said primary element.

2. An electrical system comprising a primary element having a movable member, a secondary element having a movable member responsive to and adjustable by and in proportion to an electric control current, an oscillation generator comprising a first resonant impedance means having a resonant frequency determinative of the oscillation frequency, a phase-shift type frequency discriminator connected to said generator comprising a second resonant impedance means and adapted to produce control current varying in sense and magnitude in proportion to the departure of the oscillation frequency from the resonating frequency of said second resonant impedance means, a reactance element forming an effective tuning element of said second resonant impedance means and adjustable in response to a movement of said primary element, means for controlling said secondary element in accordance with said control current, an electronic reactance tube arranged to form an effective tuning element of said oscillation generator and means to control said reactance tube in accordance with said control current, the frequency changes caused by said primary element and by said reactance tube in response to an initial movement of said first movable member counteracting each other, to thereby restore the balance between the oscillation frequency and the resonating frequency of said second resonant impedance means and to maintain said secondary element in a continuously and substantially instantaneously balanced follow-up relation with the movement of said primary element.

3. An electrical system comprising a primary element having a movable member, a secondary element having a movable member responsive to and adjustable by and in proportion to an electric control current, an oscillation generator comprising a resonant tank circuit having a resonating frequency determinative of the frequency of the oscillations produced, a frequency discriminator connected to said generator comprising resonant impedance means and adapted to produce a control current varying in sense and magnitude in accordance with the relative frequency departure in respect to a normal frequency balance between the oscillation frequency and the resonating frequency of said impedance means, means for controlling said secondary element in accordance with said control current, a reactance element adjustable in response to a movement of said primary element and operatively associated with said tank circuit to vary the oscillation frequency, an electronic reactance tube operatively associated with said tank circuit to additionally vary the oscillation frequency, means to control said reactance tube in response to variations of said output current, the oscillation frequency changes effected by said reactance element and said reactance tube in response to an initial movement of said primary element counteracting each other, to thereby restore said frequency balance and to maintain said secondary element in a continuously and substantially instantaneously balanced follow-up relation with said primary element.

4. An electrical system comprising an electrical instrument having a movable member, an oscillation generator comprising a resonant tank circuit having a resonant frequency determinative of the oscillation frequency, a reactance element forming an effective tuning element of said tank circuit and adjustable in response to a deflection of said instrument, an electronic reactance tube operatively connected to said tank circuit to control the oscillation frequency, an output device having a movable member adjustable by and in proportion to an electric control current, a phase-shift type frequency discriminator connected to said generator comprising a resonant impedance means and adapted to produce a control current varying in sense and magnitude in respect to a normal frequency balance in proportion to the relative frequency departure between the oscillation frequency and the resonating frequency of said impedance means, means for controlling said output device in accordance with said control current, further means to derive a control potential from said output current for controlling said reactance tube, the frequency changes effected by said reactance element and said reactance tube in response to an initial deflection of said instrument counteracting each other, to thereby restore said frequency balance and to maintain said output device in a continuously and substantially instantaneously balanced follow-up relation with said instrument.

5. An electrical system comprising an electrical instrument having a movable member, an oscillation generator comprising a resonant tank circuit having a resonant frequency determinative of the oscillation frequency, an electronic reactance tube operatively connected to said tank circuit to control the oscillation frequency, an output device having a movable member adjustable by and in proportion to an electric control current, a phase-shift type frequency discriminator connected to said generator comprising resonant impedance means and adapted to produce a control current varying in sense and magnitude in respect to a normal frequency balance in proportion to the relative frequency departure between the oscillation frequency and the resonating frequency of said impedance means, means for controlling said output device in accordance with said control current, a reactance element forming an effective tuning element of said impedance means and adjustable in response to a deflection of said instrument, means to derive a control potential from said output current for controlling said reactance tube, the frequency changes effected by said reactance tube and said reactance element in response to an initial deflection of said instrument counteracting each other, to thereby restore said frequency balance and to maintain said output device in a continuously and substantially instantaneously balanced follow-up relation with said instrument.

KARL RATH.

REFERENCES CITED

The following references are of record in the file of this patent:

UNITED STATES PATENTS

| Number | Name | Date |
|---|---|---|
| 2,361,731 | Bach | Oct. 21, 1944 |
| 2,284,266 | Regnauld | May 26, 1942 |
| 2,056,285 | Machlet | Oct. 6, 1936 |
| 2,165,510 | Rosene | July 11, 1939 |
| 2,354,945 | Cohen | Aug. 1, 1944 |
| 2,354,964 | Osterman | Aug. 1, 1944 |
| 2,280,678 | Waymouth | Apr. 21, 1942 |
| 2,280,725 | Shepard | Apr. 21, 1942 |
| 2,302,219 | Hostetler | Nov. 17, 1942 |
| 2,309,560 | Welty | Jan. 26, 1943 |
| 2,280,019 | Alexandersson et al. | Apr. 14, 1942 |